Oct. 31, 1961  L. G. COLE  3,006,836
ELECTROLYTIC DETECTING APPARATUS
Filed Jan. 27, 1958  2 Sheets-Sheet 1

INVENTOR.
LELAND G. COLE
BY
Christie, Parker & Hale
ATTORNEYS.

INVENTOR.
LELAND G. COLE
BY
Christie, Parker & Hale
ATTORNEYS.

United States Patent Office 3,006,836
Patented Oct. 31, 1961

3,006,836
ELECTROLYTIC DETECTING APPARATUS
Leland G. Cole, Arcadia, Calif., assignor, by mesne assignments, to Consolidated Electrodynamics Corporation, Pasadena, Calif., a corporation of California
Filed Jan. 27, 1958, Ser. No. 711,318
3 Claims. (Cl. 204—195)

This invention relates to electrolytic methods and apparatus for detecting the presence of hydrogen or oxygen in a sample.

Briefly, the invention contemplates the detection of oxygen or hydrogen present in a sample by effecting the chemical combination of the element to be detected with the other element required to form water and thereafter detecting the formed water, preferably by subjecting it to electrolytic decomposition.

For example, if the presence of hydrogen in a sample is to be detected, the hydrogen is reacted with oxygen to form water which is thereafter electrolytically decomposed. On the other hand, if oxygen is to be detected, it is reacted with hydrogen to form the water which is thereafter subjected to electrolytic decomposition.

To make a quantitative analysis, the amount of current required to effect the decomposition of the water is measured.

The invention is applicable to many processes. For example, it provides improved sensitivity in chromatographic work, the measurement of carbon to hydrogen ratio of hydrocarbon compounds, the detection and measurement of hydrogen or oxygen, and in leak detector techniques.

In a typical example of chromatography, a sample containing several components, say hydrocarbons of various molecular weights, is mixed with an inert carrier gas such as nitrogen or helium and passed through a chromatographic column packed with an adsorbent on which the various components are selectively adsorbed. Depending on the nature of the components and the adsorption material in the chromatographic column, the various components are retained in the column for different lengths of time, and therefore are separated on the basis of their respective retention times in the column.

A suitable detector, such as a conventional thermal conductivity cell, or a gas density balance, is at the outlet end of the column to detect and measure the individual components as they leave the column. A typical chromatographic column is capable of effecting separations of even minor constituents far more effectively than can be detected by present conventional detectors. For example, the best thermal conductivity detector cells presently employed are unable to detect a typical hydrocarbon component in a sample gas at concentrations less than about $1 \times 10^{-7}$ gm. of component/ml. of gas. Slightly improved sensitivity is obtained by using the best gas balance detectors available, which are sensitive down to component concentrations of about $0.5 \times 10^{-7}$ g./ml.

The detector of this invention extends the lower limit of detectability of typical hydrocarbon components to at least $1 \times 10^{-10}$ g./ml., which greatly improves the utility of chromatographic analysis. Thus, with the high sensitive detector of this invention, lower chromatographic column loadings may be employed, resulting in better column performance. In addition, the detector of this invention is virtually independent of temperature, thus eliminating the need for internal calibration, standardization, and the use of reference cells or junctions such as are required when using thermal conductivity cells.

Also, evidence has been obtained which shows that binary constituted peaks, i.e., signals produced by the detector due to the presence of two components with almost equal retention times, are indicated as single peaks by some of the present chromatographic detectors, thus giving rise to error in chromatographic analysis with present techniques. The improved sensitivity provided by this invention reduces the possibility of this difficulty, further improving the utility of chromatographic analysis.

In view of its simpler construction, the initial cost and maintenance of the detector of this invention is considerably less than that of the more complicated detectors now in use.

By using the invention to determine the presence and amount of oxygen in a sample stream, hydrogen is added to the sample stream and reacted with oxygen in the sample to form water, which is detected, preferably by electrolytic decomposition, including detecting electric current required to effect the decomposition. Similarly, hydrogen is detected in a sample stream by combining it with the required amount of oxygen to form water which is then electrolytically decomposed and detected. When the quantity of oxygen or hydrogen is to be measured, substantially all of the element to be measured is reacted to form water, which is electrolytically decomposed by measuring the electric current required to effect the decomposition.

When the detector is used as a leak detector, a tracer gas such as hydrogen or a hydrogen-containing gas, such as a hydrocarbon or ammonia, is used, and hydrogen present in the tracer gas is combined with oxygen to form water which is detected by electrolytic decomposition.

When the detector is used to measure the carbon to hydrogen ratio of a hydrocarbon, the sample is oxidized to form water and carbon dioxide. The amount of hydrogen in the sample is determined by electrolytic decomposition of the water, and the amount of carbon is determined by measuring the amount of carbon dioxide by well known techniques.

In terms of apparatus for detecting in a sample the presence of one of the two elements of water, the invention contemplates a reaction chamber for chemically combining the element to be detected with the other element to form water. Means for detecting the water so formed is connected to the reaction chamber. Preferably, an electrolytic decomposition cell for decomposing the water so formed is connected to the reaction chamber, and means are provided for detecting the electric current required for the decomposition.

These and other aspects of the invention will be more fully understood from the following detailed description taken in conjunction with the accompanying drawings in which.

Figure 1:
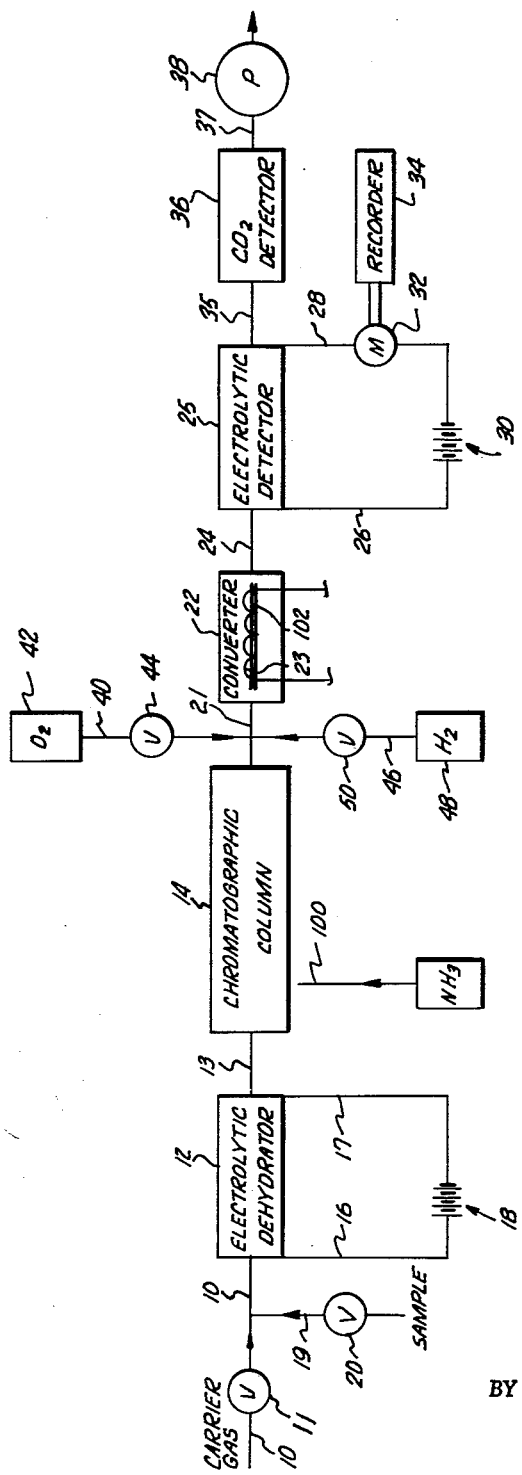
FIG. 1 is a schematic flow diagram showing the assembly of various equipment required to practice the invention as a chromatograph detector, hydrogen detector, oxygen detector, carbon to hydrogen ratio analyzer, and a leak detector.
Figure 2:
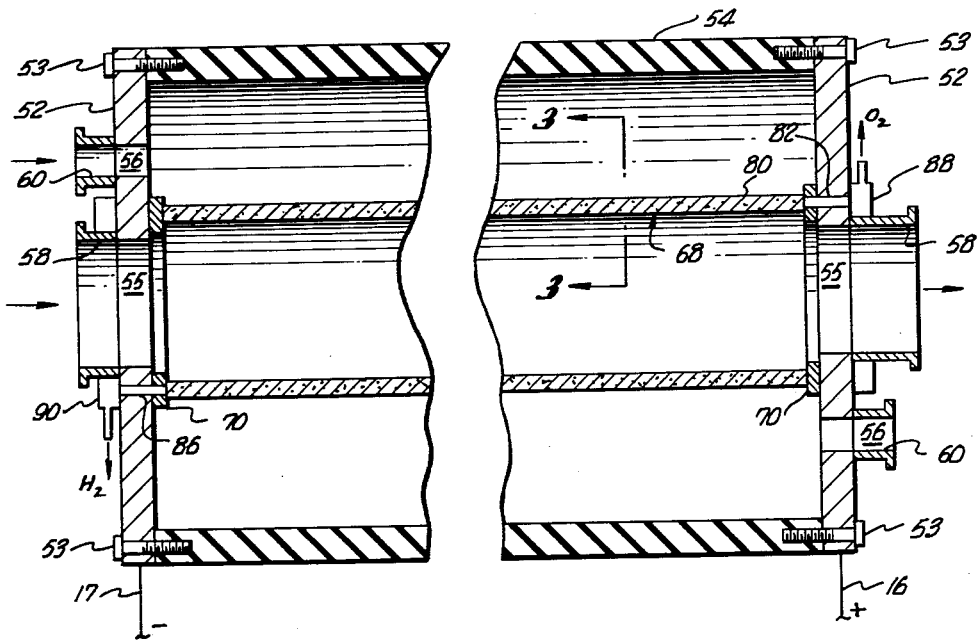
FIG. 2 is a schematic sectional elevation of one form of an electrolytic detector or dehydrator used in the invention.
Figure 3:
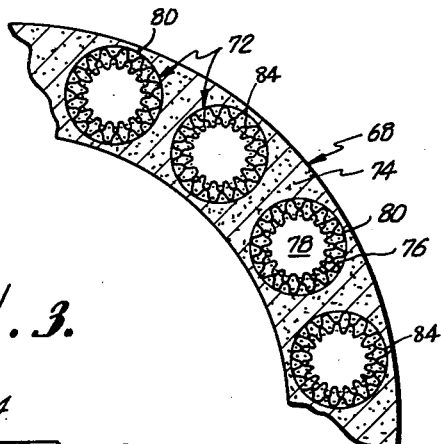
FIG. 3 is a view taken on line 3—3 of FIG. 2.

Referring to FIG. 1, a carrier gas flows through a carrier gas line 10, carrier gas control valve 11, and into an electrolytic dehydrator 12 which is connected by a flow line 13 to an inlet of a chromatographic column 14 packed with a suitable adsorbent, such as charcoal, silica gel, etc. An anode 16 and a cathode 17 of the electrolytic dehydrator, which is the subject matter of my copending application Serial No. 676,117, filed August 5, 1957, and which is described in detail below in conjunction with FIGS. 2 and 3, are connected to the positive and negative terminals, respectively of a source of D.C. electric power 18. A fluid sample is admitted through a line 19 and sample control valve 20 to the carrier gas line ahead of the dehydrator.

The outlet of the chromatographic column is connected by a flow line 21 to the inlet of a converter chamber 22 which includes a heated electric coil 23 supplied power from a suitable source (not shown). The outlet of the converter is connected by a flow line 24 to the inlet of an electrolytic detector 25 which has an anode 26 and a cathode 28 connected to the positive and negative terminals, respectively, of a source of D.C. power 30. An electric meter 32 and recorder 34 are connected in the circuit of the electrolytic detector to measure and record the amount of current flowing through the detector. The outlet of the electrolytic detector is connected by a flow line 35 to the inlet of a carbon dioxide detector 36, which has its outlet connected by a flow line 37 to the inlet of a vacuum pump 38.

Oxygen can be supplied to the flow line 21 between the chromatographic column and the converter through an oxygen supply line 40 connected to an oxygen supply 42. The introduction of oxygen is controlled through an oxygen control valve 44. Hydrogen may also be introduced to the carrier gas at the same point through a hydrogen supply line 46 connected to a hydrogen supply 48 controlled by a hydrogen control valve 50.

Referring to FIG. 2, which shows the electrolytic dehydrator or detector in detail, a pair of circular metal end plates 52 are secured by screws 53 over the opposite ends of a tubular outer housing 54 made of a suitable insulating material such as plastic. Each end plate includes a central opening 55 and a side opening 56 extending through it. A separate flange connection 58 around each central opening is adapted to be connected to flow lines to let fluid pass through the housing interior. Similar flange connections 60 are disposed around the side outlets in the plates. The right side (as viewed in FIG. 2) plate is connected through the lead 16 to the positive side of the D.C. source 18, and is hereinafter referred to as the anode end plate. The other end plate is connected through a lead 17 to the negative terminal of the D.C. source, and is hereinafter referred to as the cathode plate. A tubular sorption matrix 68 is coaxially disposed in the housing and sealed at each end against the end plates by a separate annular electrically insulating gasket 70 around each central opening in the end plates.

As shown most clearly in FIG. 3, the sorption matrix includes a plurality of elongated longitudinal tubes 72 spaced from each other and bridged and held together by a suitable sorption medium 74 such as dehydrated phosphoric acid. Each electrode is formed from a roll of screen 76 so that each electrode has a longitudinal passageway 78, and also has lateral permeability due to the porosity of the screen. The hollow and porous electrodes can be formed in a variety of ways and from many different materials. A suitable electrode is made by rolling a section of screen of about 300 mesh to form a tube having an outside diameter of $3/16''$ and an inside diameter of $1/32''$. After rolling the screen is heated to cause the screen to fuse, but not close the screen openings. The electrodes can be of any suitable materials which are inert to the sorption medium and the electrolytic decomposition products. For example, in removing water with anhydrous phosphoric acid, the anodes are made of platinum, and the cathodes are made of stainless steel. The spacing between, and voltage across, adjacent anodes and cathodes can vary widely, but a spacing of 1 mil and voltage of 30 volts provides satisfactory operation at about 30° C. and near atmospheric pressure.

The sorption matrix may be prepared in different ways. One suitable way is to support the electrodes in a suitable holder (not shown) in the configuration shown in FIG. 2, and then coat the exterior of the electrodes with phosphoric acid, appplying a suitable number of layers with drying between each application to build up a sorption medium as shown in FIG. 3. Thus, a tubular sorption matrix is formed which is coated on both its interior and exterior with the sorption medium. The sorption matrix is electrically conductive when wet and non-conductive when dry. The sorption matrix can also be built up on the electrodes by vapor deposition, spraying, etc.

Alternate electrodes 80 project from one end of the sorption matrix through gasket 70 and into respective bores 82 formed through the anode end plate around the central opening of the plate. The projecting portions of electrodes 80 are uncoated and are in good electrical contact with the anode plate, thus serving as anodes. The other ends of the anodes butt against the gasket on the cathode end plate so those ends are sealed and insulated from the cathode plate.

The electrodes 84 disposed between adjacent anodes project from the opposite end of the sorption matrix through the gasket 70 and into respective bores 86 formed through the cathode plate around the central opening of the plate. The projecting portions of electrodes 84 are uncoated and are in good electrical contact with the cathode plate, thus serving as cathodes. The other ends of the cathodes butt against the sealing gasket at the anode plate so those ends of the cathodes are sealed and insulated from the anode plate. An annular anode collection manifold 88 is sealed over the anode openings in the anode plate, and an annular cathode collection manifold 90 is sealed over the cathode openings in the cathode plate, so that the electrolytic decomposition products can be collected separately and independently of each other in the manifolds, and be isolated from the fluid passing through the dehydrator.

The operation of the apparatus of FIGS. 2 and 3 is as follows:

The fluid or mixture of sample and carrier gas flows through the center of the sorption matrix by passing in and out the central openings of the end plate, and through the annular space between the sorption matrix and the housing by flowing in and out the side openings in the end plates. In this way, both sides of the sorption matrix are utilized. As shown by arrows of FIG. 2, fluid flows in the central opening of the anode plate and out the central opening of the cathode plate, and fluid flows in the side opening of the cathode plate and out the side opening of the anode plate. As fluid flows through the apparatus in contact with the sorption matrix, moisture which may be in the mixture of sample and carrier is sorbed so the matrix becomes electrically conductive. The sorbed water is subjected to the electric field established in the sorption matrix between adjacent electrodes, and electrolytic decomposition takes place, so hydrogen ions diffuse to the cathodes and oxygen ions diffuse to the anodes. The ions are neutralized at their respective electrodes, diffuse into the central passageway of each electrode and then pass to the respective collection manifold where they are collected or discharged to atmosphere. The current automatically stops when all the sorbed water is decomposed because the sorption matrix becomes non-conducting. Thus, a mixture of sample and carrier free of moisture and free of oxygen and hydrogen due to electrolytic decomposition of moisture enters the chromatograph column. The removal of the hydrogen or oxygen gas formed in the dehydrator from the sample stream is not necessary when analyzing for materials such as hydrocarbons which have much longer retention times than hydrogen or oxygen, and therefore do not interfere with hydrocarbon spectra.

Figure 4:
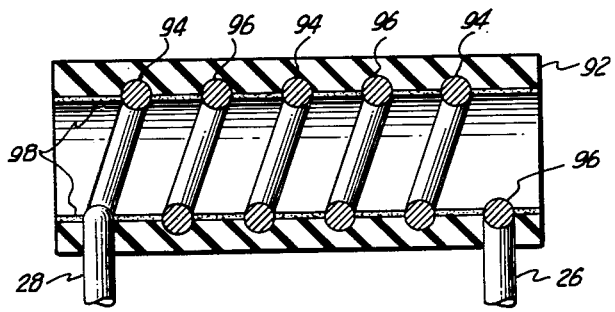
FIG. 4 is a longitudinal section of another form of electrolytic detector used in the invention.

FIG. 4 shows a longtudinal section of a typical electrolytic cell which may be used as the electrolytic detector, if removal of the electrolytic decomposition products is not desired or required. If removal of either or both of the decomposition products is preferred, the electrolytic cell of FIGS. 2 and 3 is used as the detector. The electrolytic cell of FIG. 4 includes a cylindrical glass tube 92. A first coil of wire 94 is embedded in the interior surface of the tube with a portion of the wire extending into the tube. A second coil of wire 96 with turns between adjacent turns of the first coil of wire is similarly embedded in the interior surface of the tube. A layer of a hygroscopic adsorbent 98 such as dried phosphoric acid is deposited on the glass wall between the coils of wire to leave the innermost portion of each coil uncovered. Other hygroscopic materials which are electrically conductive only when wet, such as dried KOH and dried NaOH, may also be used. One of the coils of wire is connected to the anodes of the D.C. power supply 30 and the other is connected to the cathode of the power supply. Thus, when a fluid containing water flows through the cell, the water is adsorbed by the hygroscopic layer, and then becomes conductive. The adsorbed water is subjected to electrolytic decomposition, and hydrogen and oxygen are released at the exposed surface of the electrodes and diffuse into the flow stream.

Another type of electrolytic cell which can be used as an electrolytic detector is described in U.S. Patent No. 2,816,067.

In using the invention as an oxygen detector, the chromatographic column may be omitted, although it need not necessarily be cut out of the flow stream if it has no effect on the passage of oxygen through it. The use of a carrier gas is optional, depending on the character of the sample. If the sample containing the oxygen has an unknown and undesirable quantity of moisture present, it is removed by passing it through the electrolytic dehydrator. The decomposition products of the dehydrator are removed from the sample stream as described with respect to FIGS. 2 and 3.

Sufficient hydrogen is added to the sample stream through line 46 and the hydrogen control valve 50 to insure complete reduction of all of the oxygen present in the sample to water. The sample stream then flows into the converter, which may be a heated platinum wire, a heated copper oxide combustor, or other suitable means to effect a chemical combination of substantially all of the oxygen with hydrogen to form water. The sample stream and water then flows through the electrolytic detector where the water is adsorbed and electrolytically decomposed into hydrogen and oxygen. The current required for this decomposition is measured and recorded by the meter and recorder in the electrolytic detector circuit as a measure of the amount of oxygen present.

For the detection of hydrogen, the same procedure for oxygen detection is followed, except that oxygen instead of hydrogen is added to the flow stream. If desired, the oxygen may be added in the form of air. For the purpose of hydrogen and oxygen determinations, the carbon dioxide detector need not be present in the flow stream.

In using the invention to improve chromatographic sensitivity, carrier gas and sample are passed through the electrolytic dehydrator which is of the type shown in FIGS. 2 and 3, so that any unknown or undesirably large quantities of moisture are removed. As explained above in connection with FIGS. 2 and 3, the decomposition products of the moisture originally present in the sample or carrier gas are removed from the flow stream.

The mixture of sample and carrier gas flow through the chromatographic column where the various components are separated on the basis of their respective retention times. Assume, for example, that amyl alcohol is one of the components of interest. If enough oxygen is not already present in the mixture of carrier gas and sample leaving the chromatographic column at the same time as the amyl alcohol, the required amount of oxygen is added through line 40 and oxygen control valve 44. The mixture of amyl alcohol, carrier gas and oxygen enter the converter, which may be a heated platinum wire or a copper oxide combustor, where the amyl alcohol is burned to form carbon dioxide and water. The reacted mixture then flows through the electrolytic detector, where the amount of water formed is detected and measured by the meter and recorder in the electrolytic detector circuit. If the carbon to hydrogen ratio of the detected component is unknown or is to be checked, the sample is further passed through the carbon dioxide detector which measures the amount of carbon dioxide formed, thus giving the basis to compute the carbon to hydrogen ratio for the sample. The carbon dioxide detector may be any of the well known type, such as a solution of sodium or barium hydroxide, which absorb carbon dioxide.

With a component such as amyl alcohol, the electrolytic detector of this invention has a sensitivity down to at least $1 \times 10^{-10}$ g./ml. In contrast, the best thermal conductivity cells previously employed are not capable of detecting concentrations of amyl alcohol in a carrier such as nitrogen gas in concentrations of less than about $1 \times 10^{-7}$. Thus, this invention provides chromatographic analysis with sensitivity 1,000 times greater than previously available.

To explain the use of the invention as a leak detector, it is assumed that the system shown in FIG. 1 is to be operated under vacuum and the chromatographic column is tested for leaks. A movable probe 100 connected to a source of tracer gas, such as ammonia is slowly moved over the chromatographic column, directing a stream of ammonia against the column. If the adsorbent in the column retains ammonia, another suitable hydrogen-containing gas inert to the column, such as methane, or hydrogen, is used. Other tracer gases such as oxygen, or even air, may be used when the test equipment is suitably enclosed to make the tracer gas distinguishable from the ambient atmosphere. If the probe is moved in the vicinity of a leak, the tracer gas finds its way into the system and is carried into the converter. A small supply of oxygen is added to the converter, which, if ammonia is used as the tracer gas, includes a heated lead peroxide section 102 to effect decomposition of the ammonia and formation of water, which is then detected in the electrolytic detector, thereby indicating the presence of a leak.

I claim:

1. Apparatus for detecting in a sample the presence of one of the two elements of water comprising a reaction chamber for chemically combining the element in the gas phase to be detected with the other element to form water, an electrolytic decomposition cell connected to the reaction chamber, a solid hygroscopic electrolyte in the cell for sorbing water, means for electrolytically decomposing the water sorbed by the electrolyte, means for measuring the decomposition current, and diffusion means for separating one of the decomposition products from the sample during the sorption and electrolysis.

2. Apparatus for detecting in a sample the presence of one of the two elements of water comprising a reaction chamber for chemically combining the element in the gas phase to be detected with the other element to form water, an electrolytic decomposition cell connected to the reaction chamber, a solid hygroscopic electrolyte in the cell for sorbing water, means for electrolytically decomposing the water sorbed by the electrolyte, means for measuring the decomposition current, and diffusion means for separating both of the decomposition products from the sample during the sorption and electrolysis.

3. Apparatus for detecting in a sample the presence of one of the two elements of water comprising a reaction chamber for chemically combining the element in the gas phase to be detected with the other element to form water, an electrolytic decomposition cell connected to the reaction chamber, a solid hygroscopic electrolyte in the cell for sorbing water, means for electrolytically decomposing the water sorbed by the electrolyte, means for measuring the decomposition current, and diffusion means for separately removing each of the decomposition products from the sample during the sorption and electrolysis.

(References on following page)

References Cited in the file of this patent

UNITED STATES PATENTS

| | | |
|---|---|---|
| 1,913,702 | D'Adrian | June 13, 1933 |
| 2,036,251 | Boynton | Apr. 7, 1936 |
| 2,098,629 | Knowlton | Nov. 9, 1937 |
| 2,384,463 | Gunn et al. | Sept. 11, 1945 |
| 2,591,808 | Guild | Apr. 8, 1952 |
| 2,681,571 | Becker | June 22, 1954 |
| 2,813,010 | Hutchins | Nov. 12, 1957 |
| 2,816,067 | Keidel | Dec. 10, 1957 |
| 2,830,945 | Keidel | Apr. 15, 1958 |

OTHER REFERENCES

Nature, vol. 180, August 10, 1957, pp. 295–296.

Heaton et al.: Analytical Chemistry, vol. 31, No. 3, March 1959, pp. 349–356.

Kirner: Ind. and Eng. Chemistry, vol. 9, 1937, pp. 535–539.